United States Patent [19]

Matsushima

[11] 4,333,151
[45] Jun. 1, 1982

[54] METHOD FOR PROTECTING AN ELECTRIC POWER SYSTEM AND DIGITAL PROTECTIVE SYSTEM

[75] Inventor: Tetsuo Matsushima, Fuchu, Japan

[73] Assignee: Tokyo Shibaura Denki Kabushiki Kaisha, Japan

[21] Appl. No.: 106,365

[22] Filed: Dec. 21, 1979

[30] Foreign Application Priority Data

Dec. 28, 1978 [JP] Japan ................................ 53/161129

[51] Int. Cl.³ .............................................. H02H 3/42
[52] U.S. Cl. ..................................... 364/492; 364/483; 361/80
[58] Field of Search ........................ 364/492, 483, 493; 361/80

[56] References Cited

U.S. PATENT DOCUMENTS

| | | | |
|---|---|---|---|
| 3,599,044 | 8/1971 | Takemura et al. | 361/80 X |
| 3,885,199 | 5/1975 | Nohara et al. | 361/79 |
| 3,931,502 | 1/1976 | Kohlas | 361/80 X |
| 3,984,737 | 10/1976 | Okamura et al. | 361/80 |

*Primary Examiner*—Edward J. Wise
*Attorney, Agent, or Firm*—Stevens, Davis, Miller & Mosher

[57] ABSTRACT

In a method and a system for protecting an electric power system, a signal useful for the protection is produced through operation on a digital data $q_m$ indicative of an instantaneous value at a first time point of an AC electrical quantity and another digital data given by $\frac{1}{2}\{axq_{m-n}-(2-a)xq_{m-n+l}\}$ where $q_{m-n}$ and $q_{m-n+l}$ represent data indicative of instantaneous values of an AC electrical quantity, at a time point in advance of the first time point by an angle of $\alpha°$ ($0 \leq \alpha \leq 180$), and at a time point lagging behind the first time point by an angle of $(180-\alpha)°$, respectively, and a equals to $\alpha/90$.

16 Claims, 12 Drawing Figures

METHOD FOR PROTECTING AN ELECTRIC POWER SYSTEM AND DIGITAL PROTECTIVE SYSTEM

BACKGROUND OF THE INVENTION

The present invention relates to a method and apparatus for use in a protective relay system including a digital computer for protecting an electric power system.

In a protective relay system including a digital computer, AC electrical quantities such as voltage and current of the electric power system are sampled and processed. It is sometimes required to obtain data sampled at different phase angles. For instance, squares of two data sampled at phase angles 90° apart from each other are added to determine the square of the amplitude of a current. Where the sampling interval is 30°, the data $i_m$ obtained at a sampling time point and the data $i_{m-3}$ obtained at a sampling time point preceding the first mentioned sampling time point by three sampling intervals. These data are used to calculate the square of the amplitude I in accordance with the following equation:

$$I^2 = i_m^2 + i_{m-3}^2 \tag{1}$$

It should however be noted here that equality of the difference between the sampling time points of the two data $i_m$ and $i_{m-3}$ with 90° is maintained on condition that the frequency of the detected current and the frequency of an oscillator used to determine the sampling interval have a constant relationship between them. Calculation in accordance with the equation (1) is affected, for example, by variation of the frequency of the detected current. If the variation of the angular frequency is $\Delta\omega$, then $$\begin{aligned} i_m &= I_o \sin(\omega + \Delta\omega)t \\ i_{m-3} &= I_o \sin\left\{ (\omega + \Delta\omega)t - \frac{\pi}{2} - \frac{\Delta\omega}{\omega} \cdot \frac{\pi}{2} \right\} \end{aligned} \tag{2}$$

where $I_o$ represents a true value of the amplitude of the current. From the equations (1) and (2), we obtain:

$$\begin{aligned} \frac{I^2}{I_o^2} &= \sin^2(\omega + \Delta\omega)t + \sin^2\left\{ (\omega + \Delta\omega)t - \frac{\pi}{2} - \frac{\Delta\omega}{\omega} \cdot \frac{\pi}{2} \right\} \\ &= \sin^2(\omega + \Delta\omega)t + \left[ \sin\left\{ (\omega + \Delta\omega)t - \frac{\pi}{2} \right\} \cdot \right. \\ &\quad \left. \cos\frac{\Delta\omega}{\omega} \cdot \frac{\pi}{2} - \cos\left\{ (\omega + \Delta\omega)t - \frac{\pi}{2} \right\} \cdot \sin\frac{\Delta\omega}{\omega} \cdot \frac{\pi}{2} \right]^2 \\ &= \sin^2(\omega + \Delta\omega)t + \sin^2\left\{ (\omega + \Delta\omega)t - \frac{\pi}{2} \right\} \cdot \\ &\quad \cos^2\frac{\Delta\omega}{\omega} \cdot \frac{\pi}{2} - \tfrac{1}{2}\sin^2\left\{ (\omega + \Delta\omega)t - \frac{\pi}{2} \right\} \cdot \sin\frac{\Delta\omega}{\omega} \cdot \pi + \end{aligned} \tag{3}$$

-continued
$$\cos^2\left\{ (\omega + \Delta\omega)t - \frac{\pi}{2} \right\} \cdot \sin^2\frac{\Delta\omega}{\omega} \cdot \frac{\pi}{2}$$

It will be understood that I signifies the calculated value of the amplitude of the current.

The third and fourth terms $\cos^2 \Delta\omega/\omega \cdot \pi/2$ in the second term of the equation (3) are error factors. If, for example, $\Delta\omega/\omega = 0.1$, then:

$\cos^2 \Delta\omega/\omega \cdot \pi 2 = 0.976$ $\sin \Delta\omega/\omega \cdot \pi = 0.309$ $\sin^2 \Delta\omega/\omega \cdot \pi 2 = 0.0245$ It will be seen that the third term predominates among the factors of the error. With the variation of the frequency of 10%, the error in $I^2$ as calculated in accordance with the equation (1) is, at the most, in the order of 16%. The error in I is, at the most, about 7%.

SUMMARY OF THE INVENTION

An object of the invention is to provide a digital protective relay system in which the errors in the calculated electrical quantities due to a variation of the frequency of the electrical quantities are minimized.

According to one aspect of the invention, there is provided a machine implemented method for protecting an electric power system comprising the steps of:

sampling, at a predetermined sampling interval, an AC electrical quantity in said electric power system to obtain sampled data, each of which is indicative of an instantaneous value of said electrical quantity at a respective sampling time point, converting said sampled data into first digital data, preparing from said first digital data a digital data $q_m$ indicative of an instantaneous value at a first time point of an AC electrical quantity relating to said electric power system and digital data $q_{m-n}$ and $q_{m-n+l}$ indicative of instantaneous values of an AC electrical quantity relating to said electric power system, the data $q_{m-n}$ being indicative of an instantaneous value at a time point in advance of said first time point by an angle of $\alpha°$ in the range of from 0° to 180°, and the data $q_{m-n+l}$ being indicative of an instantaneous value at a time point lagging behind said first time point by an angle of $(180-\alpha)°$, calculating a first value in accordance with the following expression:

$$\tfrac{1}{2}\{a \times q_{m-n} - (2-a) \times q_{m-n+l}\}$$

where $a = \alpha/90$ and, producing from the data $q_m$ and said calculated first value, a signal for use as a condition for tripping a circuit breaker in said electric power system or for operating an alarm device.

According to another aspect of the invention, there is provided a digital protective relay system for protecting an electric power system, comprising:

means for sampling, at a predetermined sampling interval, an AC electrical quantity in the electric power system to obtain data each indicative of an instantaneous value of the electric quantity at the respective sampling time point, an analog-to-digital converter for converting the sampled data into digital data, means for storing the digital data, and processing means for retrieving said stored digital data and preparing a digital data $q_m$ indicative of an instantaneous value at a first time point of an AC electrical quantity concerning the electric power system, and digital data $q_{m-n}$ and $q_{m-n+l}$ indicative of instantaneous values of an AC electrical quantity concerning the electric power system, the data $q_{m-n}$ being indicative of an instantaneous value at a time point in advance of said first time point by an angle of $\alpha°$ in the range of from 0° to 180°, and the data $q_{m-n+l}$ being indicative of an instantaneous value at a time point lagging behind said first time point by an angle of $(180-\alpha)°$, calculating a first value in accordance with the following expression:

$$\tfrac{1}{2}\{a \times q_{m-n} - (2-a) \times q_{m-n+l}\}$$

where $a = \alpha/90$ and, producing from the data $q_m$ and said first value, a signal for use as a condition for tripping a circuit breaker in said electric power system or for operating an alarm device.

DESCRIPTION OF THE EMBODIMENTS

Figure 1A:
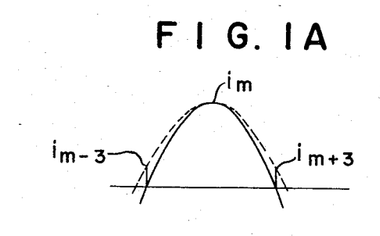
FIGS. 1A and 1B are graphs showing the differences due to frequency variations which cause error in calculations.
Figure 1B:
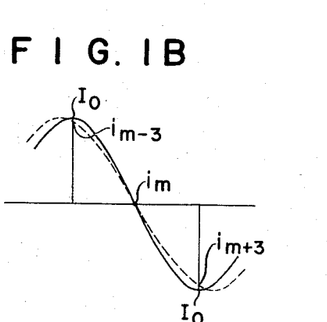

In FIGS. 1A and 1B, sinusoidal waves of normal frequency are illustrated by solid lines and sinusoidal waves of a varied frequency are illustrated by dotted lines. In FIG. 1A, the data $i_m$ is obtained at the peak value point (time point at which the instantaneous value of the electrical quantity assumes the peak value), and the data $i_{m-3}$ and $i_{m+3}$ are obtained at points 90° apart from the peak value point. In FIG. 1B, the data $i_m$ is obtained at the zero crossing point and the data $i_{m-3}$ and $i_{m+3}$ are obtained at points 90° apart from the zero crossing point. In each of FIGS. 1A and 1B, the differences between the sampled values ($i_{m-3}$, $i_{m+3}$ in FIG. 1A and $i_{m-3}$, $i_{m+3}$ in FIG. 1B) on the dotted line and the true values (0,0 in FIG. 1A and $I_o$, $I_o$ in FIG. 1B) on the solid line represent factors of an error in the calculated electrical quantity I. In FIG. 1A, the differences $(i_{m-3}-0)$ and $(i_{m+3}-0)$ are of the same sign. In FIG. 1B, the differences $(i_{m-3}-I_o)$ and $\{i_{m+3}-(-I_o)\}$ are of the different signs. It should however be noted that the differences $(i_{m-3}-I_o)$ and $\{i_{m+3}-(-I_o)\}$ in FIG. 1B are of smaller magnitude than the differences $(i_{m-3}-0)$ and $(i_{m+3}-0)$ in FIG. 1A. It will therefore be appreciated that if $\tfrac{1}{2}(i_{m-3}-i_{m+3})$ is used in place of $i_{m-3}$ in the equation (1), the error in the calculated amplitude I of the electrical quantity by the frequency variation is reduced. With the angular frequency variation $\Delta\omega$, $$\tfrac{1}{2}(i_{m-3} - i_{m+3}) = \tfrac{1}{2}\left[\sin\left\{(\omega+\Delta\omega)t - \tfrac{\pi}{2} - \tfrac{\Delta\omega}{\omega}\cdot\tfrac{\pi}{2}\right\} - \sin\left\{(\omega+\Delta\omega)t + \tfrac{\pi}{2} + \tfrac{\Delta\omega}{\omega}\cdot\tfrac{\pi}{2}\right\}\right]$$

$$= -\sin\left(1 + \tfrac{\Delta\omega}{\omega}\right)\tfrac{\pi}{2} \cdot \cos(\omega+\Delta\omega)t \tag{4}$$

In the equation (4), $\sin(1+\Delta\omega/\omega)\pi/2$ is a factor of an error in the calculation. When $\Delta\omega/\omega = 0.1$, then $\sin(1+\Delta\omega/\omega)\pi 2 \approx 0.988$. If there were no frequency variation, $\sin(1+\Delta\omega/\omega)\pi/2 = 1$. Accordingly, the difference $0.988 - 1 = -0.012$, that is $-1.2\%$.

Where $\tfrac{1}{2}(i_{m-3}-i_{m+3})$ is substituted for $i_{m-3}$ in the equation (1), $$I^2 = i_m^2 + \tfrac{1}{4}(i_{m-3}-i_{m+3})^2 \tag{5}$$

when $i_m = I_o \sin(\omega+\Delta\omega)t$ as discussed with reference to the equation (2), one will obtain, from the equations (4) and (5), the following equation (6).

$$I^2/I_o^2 = \sin^2(\omega+\Delta\omega)t + \sin^2(1+\Delta\omega/\omega)\pi/2 \cdot \cos^2(\omega+\Delta\omega)t \tag{6}$$

In the equation (6), the factor of an error is $\sin^2(1+\Delta\omega/\omega)\pi/2$, which is 0.9755 when $\Delta\omega/\omega = 0.1$. The difference $(0.9755-1) = -0.0245$, that is $-2.45\%$. This error of 2.45% is much smaller than the error of 16% when the equation (1) is used. The error of 2.45% in $\sin^2(1+\Delta\omega/\omega)\pi/2$ means the error of 1.2% in I.

Figure 2:
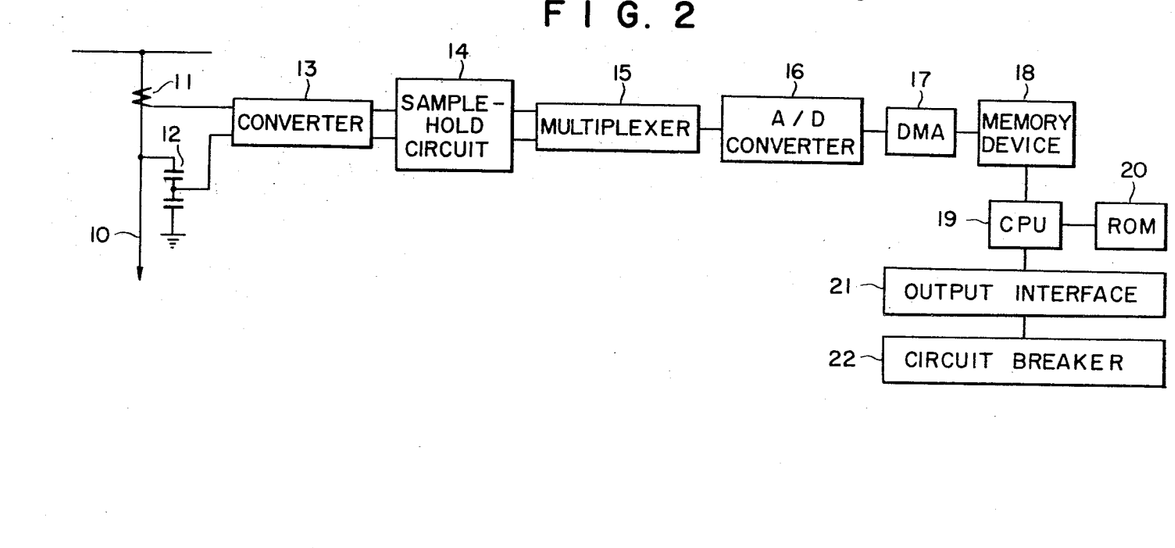
FIG. 2 is a block diagram showing an embodiment of a digital protective relay system according to the invention.

FIG. 2 shows an embodiment of a digital relay system according to the invention. An electric current flowing through and an electric voltage on the transmission line 10 of an electric power system are detected by a current transformer 11 and a potential transformer 12, and then converted to have suitable voltage levels by a converter 13, and are then sampled at an interval of 30° and held by a sample-hold circuit 14. The outputs of the sample-hold circuit 14 are supplied through a multiplexer 15 to an analog-to-digital converter 16, where they are converted into digital data. A direct memory access device 17 writes the digital data in a memory device 18 at the constant sampling interval.

Figure 3:
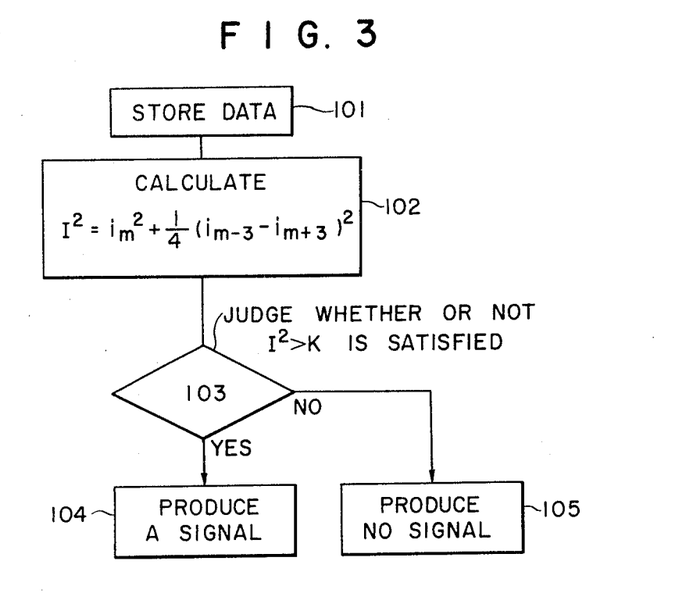
FIG. 3 is a flowchart showing a sequence of operations performed when the digital protective relay system is used for detecting an overcurrent.

A central processing unit 19 performs an arithmetic operation using the data stored in the memory device 18 and in accordance with the equation (5). A read only memory device 20 stores the program which should be executed by the central processing unit 19. An output interface device 21 outputs a signal, which is used for tripping a circuit breaker 22 or for operating an alarm device.

Where the digital relay system shown in FIG. 2 is used to detect an overcurrent, it operates in a manner illustrated in FIG. 3.

First, necessary data are read out of the area of the memory device 8 in which the direct memory access 17 has written, and are transferred and stored in a specified area of the memory device 18, at a step 101.

Then, an arithmetic operation using the data stored in the memory device 18 and in accordance with the equation (5) is performed to obtain $I^2$, at a step 102.

Subsequently, it is judged whether the result of the arithmetic operation is greater than a predetermined value K, at a step 103.

If it is judged that $I^2$ is greater than K, then a signal indicating that the current is an overcurrent is outputted, at a step 104. Such a signal may be combined with output signals from other relay systems, to judge whether there is a fault in the electric power system. If, at the step 103, it is judged that $I^2$ is not greater than K, then no signal indicating an overcurrent is produced (105).

The present invention is not limited to a system in which the amplitude of an electrical quantity is calculated, but is applicable to any system in which data of instantaneous values 90° apart from each other are used for calculation.

Figure 4:
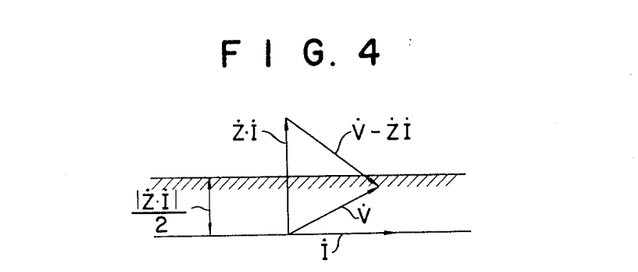
FIG. 4 is a vector diagram showing a principle of a reactance characteristic in which the absolute values of the vectors are compared.

FIG. 4 shows a principle of calculation of a digital relay system in which a reactance characteristic is obtained from comparison of magnitudes of two vectors. In FIG. 4, arg $\dot{Z}=90°$. From comparison between the magnitudes between the voltage vector $\dot{V}$ and a synthetic vector $\dot{V}-\dot{Z}\dot{I}$, a reactance characteristic for judging whether or not:

$$|\dot{V}-\dot{Z}\dot{I}|-|\dot{V}|-K_o>0 \qquad (7)$$

is satisfied is obtained. In the expression (7), $K_o$ represents a constant which is used to restrain unstable operation when $\dot{V}$ and $\dot{I}$ are small, and which has a negligible magnitude under the normal condition.

In order to perform the arithmetic operation of the expression (7), instantaneous values of $(\dot{V}-\dot{Z}\dot{I})$ and $\dot{V}$ are necessary. If the sampling interval is 30°, the instantaneous value of $(\dot{V}-\dot{Z}\dot{I})$ is obtained in the following manner.

$$X_m = v_m - |\dot{Z}|i_{m+3} \qquad (8)$$

where $v_m$ and $i_m$ represent data of instantaneous values of a voltage and a current, with m being a suffix indicating the time point at which the individual data is obtained. The magnitude of $X_m$ of the equation (8) varies when the frequency varies. If $\theta$ represents a phase difference between the voltage and the current, $$\left. \begin{array}{l} v_m = V_o \sin(\omega + \Delta\omega)t \\ i_m = I_o \sin\{(\omega + \Delta\omega)t + \theta\} \end{array} \right\} \qquad (9)$$

hence, $$i_{m+3}=I_o \sin\{(\omega+\Delta\omega)t+\theta+\pi/2+\Delta\omega/\omega\cdot\pi/2\} \qquad (10)$$

Figure 5:
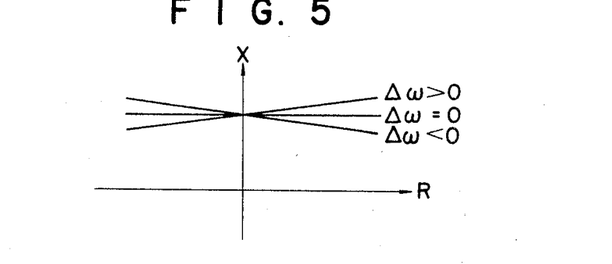
FIG. 5 is a diagram showing characteristic lines inclined due to frequency variation.

In the equation (10), $\Delta\omega/\omega\cdot\pi/2$ is the factor introducing an error. As illustrated in FIG. 5, the characteristic lines are inclined with respect to the horizontal line for $\Delta\omega=0$. The direction of inclination is dependent on whether $\Delta\omega>0$ or $\Delta\omega<0$. Strictly speaking, errors are also introduced when $|\dot{V}-\dot{Z}\dot{I}|$ and $|\dot{V}|$ are calculated from the instantaneous value of the equation (8) and $v_m$, in a similar manner to that as discussed with reference to the equations (1) and (5). But these errors are omitted from consideration to simplify the explanation.

According to the invention, the equation (8) is replaced by the following equation (11).

$$X_m = v_m - \tfrac{1}{2}|\dot{Z}|(i_{m+3}-i_{m-3}) \qquad (11)$$

Figure 6:
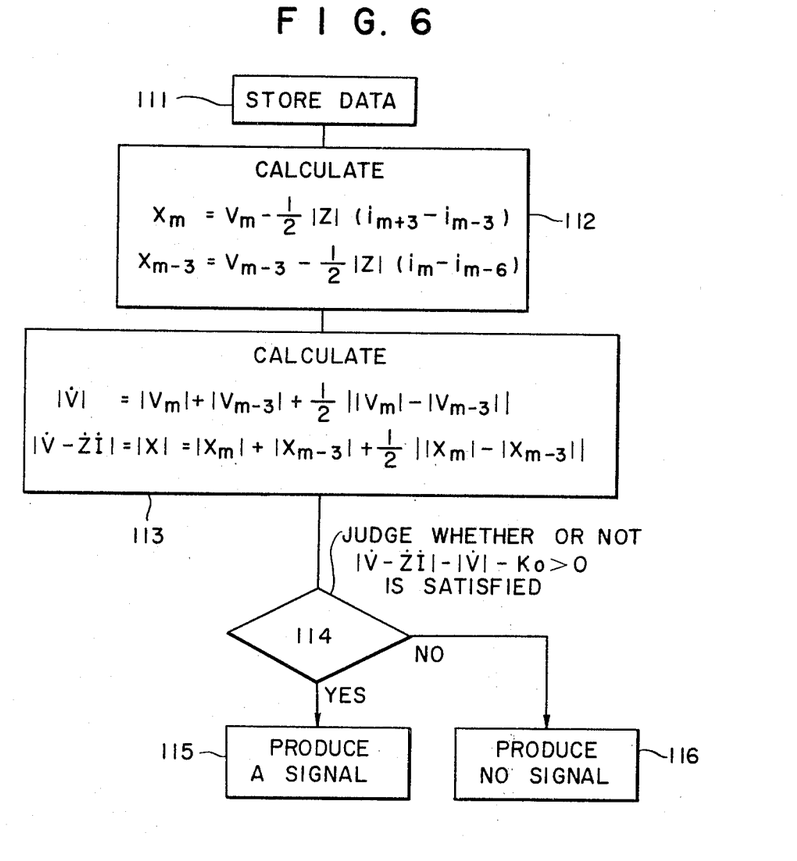
FIG. 6 is a flowchart showing a sequence of operations performed for obtaining the reactance characteristic.

The term $\tfrac{1}{2}|\dot{Z}|(i_{m+3}-i_{m-3})$ has an error whose proportion is much smaller.

Where the digital relay system shown in FIG. 2 is used to make judgement in accordance with the equation (7) with the equation (11) to act as a reactance relay, it operates in a manner shown in FIG. 6. Thus, at a step 111, necessary data are stored in a specified area of the memory device 6. At a step 112, vector synthesis to obtain $X_m$ in accordance with the equation (11) is performed using the necessary data which have been stored at the step 111. $X_{m-3}$, a synthetic vector corresponding to $X_m$, is obtained in a similar manner, but using data obtained at time points in advance of the respective time points at which the data used to calculate $X_m$ are obtained.

At a step 113, the absolute values of the synthetic vectors are calculated from the instantaneous values obtained at the step 112. The calculation of the absolute value may be effected in the same way as that discussed with reference to the equation (5), or in accordance with the equation (14) or (15) which will be discussed later, or by a method in which integration using the data obtained during a half cycle is performed. In this embodiment, the calculation is effected in accordance with the equation (14).

At a step 114, judgment in accordance with the expression (7) is performed using the absolute value of the synthetic vector obtained at 113.

Depending on the result of the judgment at the step 114, a signal indicating that the expression (7) is satisfied is produced (115) or is not produced (116).

Figure 7:
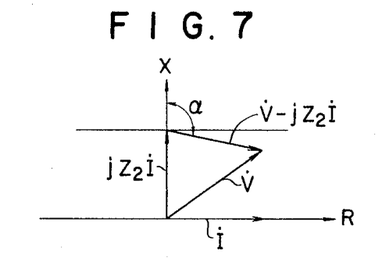
FIG. 7 is a vector diagram showing another principle by which a reactance characteristic is obtained.

The reactance characteristic can be obtained by other methods than the use of expression (7). For instance, as well be seen from FIG. 7, the condition that the angle $\alpha$ between the vectors $jZ_2I$ and $V-jZ_2I$ is not less than 90°, i.e., the scalar product of the both vectors is of negative sign, is used and the judgment is made in accordance with the following expression.

$$Z_2(i_m^2+i_{m-3}^2)-(v_{m-3} \times i_m - v_m \times i_{m-3})-K_o \geq 0 \qquad (12)$$

If substitution according to the invention is made, then the following expression is obtained.

$$\begin{aligned} & Z_2\{i_m^2 + \tfrac{1}{4}(i_{m+3}-i_{m-3})^2\} \\ & + \tfrac{1}{2}\{(v_{m+3}-v_{m-3}) \times i_m - v_m \times (i_{m+3}-i_{m-3})\} \\ & - K_o \geq 0 \end{aligned} \qquad (13)$$

The equation (1) is an example which is used to obtain the amplitude of an AC electrical quantity. But the invention is also applicable to cases where other equations are used to obtain a value proportional to the amplitude of an AC electrical quantity. The equation (14) is an example.

$$Q = |q_m| + |q_{m-3}| + \tfrac{1}{2}||q_m| - |q_{m-3}|| \qquad (14)$$

The equation (14) is used to obtain a value approximately equal to a value proportional to the amplitude. Substitution according to the invention will result in:

$$Q = |q_m| + \tfrac{1}{2}|q_{m+3}-q_{m-3}| + \tfrac{1}{2}||q_m|-\tfrac{1}{2}|q_{m+3}-q_{m-3}|| \qquad (15)$$

If the equation (15) is at the step 113 in FIG. 6 in place of the equation (14), the errors in the calculated result is further reduced.

In the embodiments described above, data 90° apart from each other are required for calculation. But the invention is applicable where data apart from each other by an angle other than 90° are required.

Figure 8:
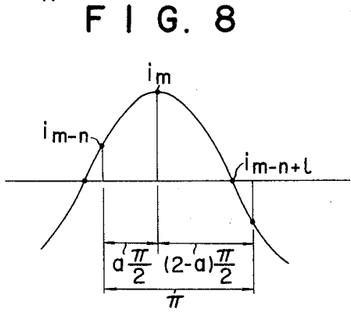
FIG. 8 is a graph showing angular relationships of data which are apart from a reference time point by angles other than $\pi/2$ and which data are obtained according to the invention.

For instance, where a data at a certain time point (reference point data) and a data at a time point apart from the reference point by an angle $a \cdot \pi/2$ ($0 \leq a \leq 2$) are required the latter can be obtained by providing two data $i_{m-n}$ and $i_{m-n+l}$ at time points which are 180° apart from each other and between which the reference point is positioned, and multiplying the two data by respective coefficients, and adding the results of the multiplications, in accordance with the following equation.

$$Y_m = \tfrac{1}{2}\{(2-a) \times i_{m-n} - a \times i_{m-n+l}\} \qquad (16)$$

wherein a represents a constant satisfying $0 \leq a \leq 2$, $i_{m-n}$ represents a data at a time point in advance, by an angle $a \cdot \pi/2$, of the reference point at which $i_m$ is obtained, $i_{m-n+l}$ represents a data at a time point lagging, by 180°, behind the time point at which $i_{m-n}$ is obtained. These relationships are illustrated in FIG. 8.

If $i_m = I_o \sin(\omega + \Delta\omega)t$, it will be appreciated from a review of FIG. 8 that the equation (16) can be transformed in the following manner.

$$\begin{aligned} \frac{Y_m}{I_o} &= \frac{2-a}{2} \cdot \sin\left\{(\omega+\Delta\omega)t - a \cdot \frac{\pi}{2} - \frac{\Delta\omega}{\omega} \cdot a \cdot \frac{\pi}{2}\right\} - \\ & \frac{a}{2} \cdot \sin\left\{(\omega+\Delta\omega)t + (2-a) \cdot \frac{\pi}{2} + \frac{\Delta\omega}{\omega}(2-a)\frac{\pi}{2}\right\} \\ &= \frac{2-a}{2} \cdot \left[\sin\left\{(\omega+\Delta\omega)t - a \cdot \frac{\pi}{2}\right\} \cdot \cos\frac{\Delta\omega}{\omega} \cdot a \cdot \right. \\ & \left. \frac{\pi}{2} - \cos\left\{(\omega+\Delta\omega)t - a \cdot \frac{\pi}{2}\right\}\sin\frac{\Delta\omega}{\omega} \cdot a \cdot \frac{\pi}{2}\right] + \\ & \frac{a}{2}\left[\sin\left\{(\omega+\Delta\omega)t - a \cdot \frac{\pi}{2}\right\}\cos\frac{\Delta\omega}{\omega}(2-a)\cdot\frac{\pi}{2} + \right. \\ & \left. \cos\left\{(\omega+\Delta\omega)t - a \cdot \frac{\pi}{2}\right\}\sin\frac{\Delta\omega}{\omega}(2-a)\frac{\pi}{2}\right] \\ &= \sin\left\{(\omega+\Delta\omega)t - a \cdot \frac{\pi}{2}\right\}\left\{\frac{2-a}{2} \cdot \cos\frac{\Delta\omega}{\omega} \cdot a \cdot \right. \\ & \left. \frac{\pi}{2} + \frac{a}{2} \times \cos\frac{\Delta\omega}{\omega}(2-a)\frac{\pi}{2}\right\} + \\ & \cos\left\{(\omega+\Delta\omega)t - a \cdot \frac{\pi}{2}\right\}\left\{\frac{a}{2} \cdot \sin\frac{\Delta\omega}{\omega}(2-a) \cdot \frac{\pi}{2} - \right. \\ & \left. \frac{2-a}{a} \cdot \sin\frac{\Delta\omega}{\omega} \cdot a \cdot \frac{\pi}{2}\right\} \end{aligned} \qquad (17)$$

In the final side of the equation (17), the coefficient:

$$\{2-a/2 \cdot \cos \Delta\omega/\omega \cdot a \cdot \pi/2 + a/2 \cdot \cos \Delta\omega/\omega(2-a)\pi/2\}$$

in the first term and the whole of the second term are the factors of an error. If a data at a time point 60° apart from the reference point, $a=60/90$. If $\Delta\omega/\omega=0.1$ (10% frequency variation), the coefficients in the first and the second terms become the following values.

$$\left.\begin{array}{l}\frac{2-a}{2}\cdot\cos\frac{\Delta\omega}{\omega}\cdot a\cdot\frac{\pi}{2}+\frac{a}{2}\cos\frac{\Delta\omega}{\omega}(2-a)\frac{\pi}{2}=0.989\\[4pt]\frac{a}{2}\cdot\sin\frac{\Delta\omega}{\omega}(2-a)\frac{\pi}{2}-\frac{2-a}{2}\cdot\sin\frac{\Delta\omega}{\omega}\cdot a\cdot\frac{\pi}{2}=-0.00038\end{array}\right\} \quad (18)$$

It will be seen from the expression (18) that the coefficient in the first term is predominating as a factor of an error, but the difference between its value and unity is as small as $(0.989-1)=-0.011$, or $-1.1\%$.

Figure 9:
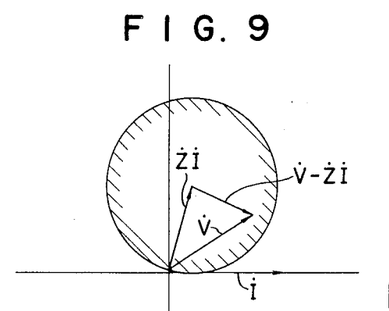
FIG. 9 is a vector diagram showing a principle of a mho characteristic in which the absolute values of the vectors are compared.

FIG. 9 shows the principle by which mho characteristic is obtained by a digital relay system. It will be understood from FIG. 9 that the mho characteristic is obtained by comparing the magnitudes of $\dot{Z}\dot{I}$ and $\dot{V}-\dot{Z}\dot{I}$, by the following expression:

$$|\dot{V}-\dot{Z}\dot{I}|-|\dot{Z}\dot{I}|-K_o>0 \quad (19)$$

If arg $\dot{Z}=60°$ and the sampling interval is 30°, and if the instantaneous values of $\dot{V}-\dot{Z}\dot{I}$ and $\dot{Z}\dot{I}$ are expressed by the following equations:

$$\left.\begin{array}{l}X_m = v_m - z\cdot i_{m-2}\\ Y_m = Z\cdot i_{m+2}\end{array}\right\} \quad (20)$$

then the desired mho characteristic is obtained. In contrast, according to the invention, the following equations are used to reduce the error.

$$\left.\begin{array}{l}X_m = v_m - \tfrac{1}{2}Z\{(2-a)\times i_{m+2} - a\times i_{m-4}\}\\ Y_m = \tfrac{1}{2}Z\cdot\{(2-a)\times i_{m+2} - a\times i_{m-3}\}\end{array}\right\} \quad (21)$$

Figure 10:
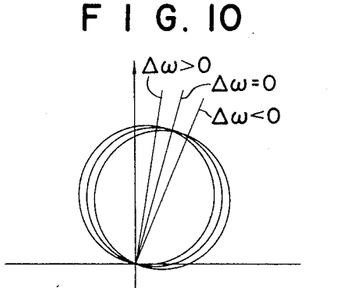
FIG. 10 is a diagram showing changes in the mho characteristic due to frequency variations.

The instantaneous values of the equations (20) or (21) can be used to calculate the absolute value of each vector and to perform the operation of the equation (19) to obtain the mho characteristic.

Where the equation (20) is used, the frequency variation leads to changes as shown in FIG. 10. In contrast, it will be understood from the equations (17) and (18) that use of the equation (21) results in much smaller changes.

Figure 11:
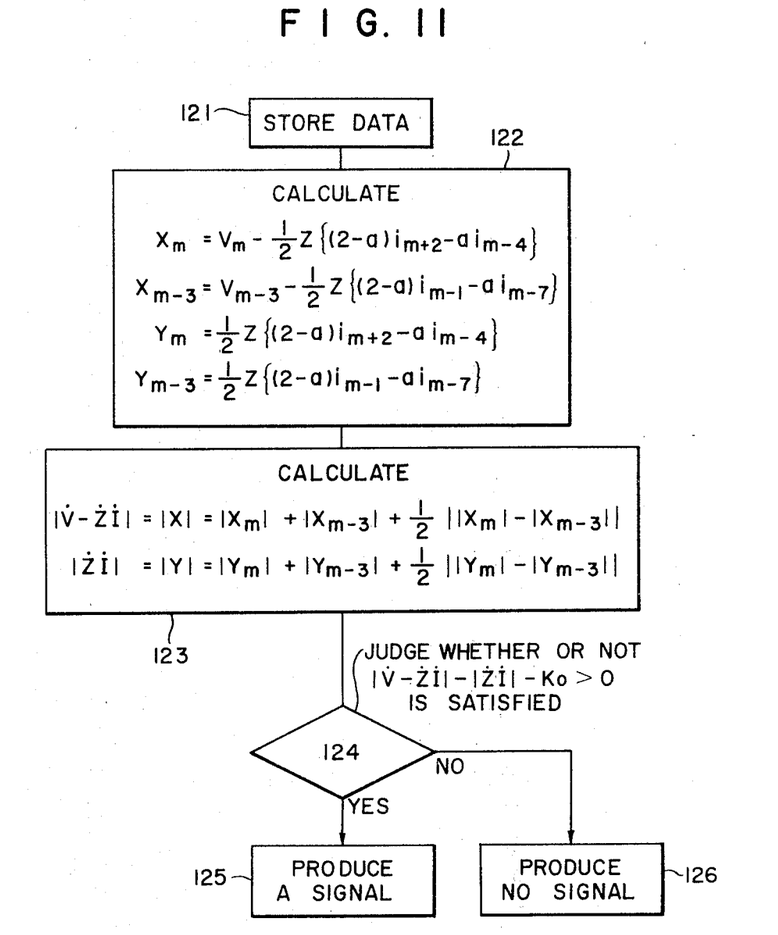
FIG. 11 is a flowchart showing a sequence of operations performed for obtaining the mho characteristic.

FIG. 11 shows the operation of the digital relay system having the mho characteristic.

At a step 121, necessary data are stored in the specified area of the memory device 18.

At a step 122, vector syntheses according to the equation (21) are performed using the data stored at the step 121.

At a step 123, the absolute values of the vectors are calculated from the synthetic vectors obtained at the step 122.

At a step 124, operation of the mho characteristic according to the expression (19) is performed using the results of the calculation at the step 123.

Depending on the result of the operation at the step 123, a signal indicating that the expression (19) is satisfied is produced (125), or is not produced (126).

The invention is not limited to the use of data ($q_m$, $q_{m-n}$, $q_{m-n+l}$) which are obtained directly by sampling at a time point and at time points which are 180° apart from each other and between which the first mentioned time point is positioned, but data which are obtained by interpolation based on sampled data may also be used. Also, it should be noted that the data ($q_m$, $q_{m-n}$, $q_{m-n+l}$) are not necessarily those on voltage or current, but may be those on the "synthetic" quantity such as $\dot{V}-\dot{Z}\dot{I}$, as exemplified by the embodiments of FIG. 6 and FIG. 11.

What is claimed is:

1. A machine implemented method for protecting an electric power system comprising the steps of:
   sampling, at a predetermined sampling interval, an AC electrical quantity in said electric power system to obtain sampled data, each of which is indicative of an instantaneous value of said electrical quantity at a respective sampling time point,
   converting said sampled data into first digital data,
   storing said first digital data,
   retrieving said first digital data and preparing therefrom a digital data $q_m$ indicative of an instantaneous value at a first time point of an AC electrical quantity relating to said electric power system and digital data $q_{m-n}$ and $q_{m-n+l}$ indicative of instantaneous values of an AC electrical quantity relating to said electric power system, the data $q_{m-n}$ being indicative of an instantaneous value at a time point in advance of said first time point by an angle of $\alpha°$ in the range of from 0° to 180°, and the data $q_{m-n+l}$ being indicative of an instantaneous value at a time point lagging behind said first time point by an angle of $(180-\alpha)°$,
   calculating a first value in accordance with the following expression:

$$\tfrac{1}{2}\{a\times q_{m-n}-(2-a)\times q_{m-n+l}\}$$

where $a=\alpha/90$
   and, producing from the data $q_m$ and said calculated first value a signal for use as a condition for tripping a circuit breaker in said electric power system of for operating an alarm device.

2. A machine implement method according to claim 1, wherein $\alpha$ equals 90°.

3. A machine implement method according to claim 2, wherein said producing step comprises performing the following calculation to find the amplitude Q of an electrical quantity:

$$Q^2 = q_m^2 + \tfrac{1}{4}(q_{m-n}-q_{m-n+l})^2.$$

4. A machine implement method according to claim 2, wherein said producing step comprises performing the following calculation to find the amplitude Q of an electrical quantity:

$$Q = |q_m| + \tfrac{1}{2}|q_{m-n+l}-q_{m-n}| + \tfrac{1}{2}||q_m|-\tfrac{1}{2}|q_{m-n+l}-q_{m-n}||.$$

5. A machine implemented method according to claim 1, wherein said digital data prepared from said first digital data comprises:

a digital data $v_m$ indicative of an instantaneous value at a first time point of an AC voltage on a transmission line in the electric power system, a digital data $v_{m-r}$ indicative of an instantaneous value of the AC voltage at a second time point in advance of said first time point by an angle of 90°, digital data $i_{m-n+l}$ and $i_{m-n}$ indicative of instantaneous value of an AC current flowing through the transmission line at time ponts which are spaced from each other by an angle of 180° and between which said first time point is positioned; and digital data $i_{m-r-n+l}$ and $i_{m-r-n}$ indicative of instantaneous values of the AC current at time points which are spaced from each other by an angle of 180° and between which said second time point is positioned.

6. A machine implemented method according to claim 5, wherein the data $q_{m-n}$ and $q_{m-n+l}$ are indicative of instantaneous values at time points spaced from said first time point by an angle of 90°, and werein said producing step comprises calculating the values:

$$X_m = v_m - \tfrac{1}{2}|\dot{Z}|(i_{m-n+l} - i_{m-n})$$

$$X_{m-r} = v_{m-r} - \tfrac{1}{2}|\dot{Z}|(i_{m-r-n+l} - i_{m-r-n})$$

wherein Z represents a constant impedance in complex notation;

$$|\dot{V} - \dot{Z}\dot{I}| = |X| = |X_m| + |X_{m-r}| + \tfrac{1}{2}||X_m| - |X_{m-r}||$$

$$|\dot{V}| = |v_m| + |v_{m-r}| + \tfrac{1}{2}||v_m| - |v_{m-r}||$$

and, judging whether the following expression is satisfied or not:

$$|\dot{V} - \dot{Z}\dot{I}| - |\dot{V}| - K_o > 0$$

where $K_o$ represents a constant.

7. A machine implemented method according to claim 5, wherein said producing step comprises calculating the values:

$$X_m = v_m - \tfrac{1}{2}Z \times \{(2-a) \times i_{m-n+l} - a \times i_{m-n}\}$$

$$X_{m-r} = v_{m-r} - \tfrac{1}{2}Z \times \{(2-a) \times i_{m-r-n+l} - a \times i_{m-r-n}\}$$

$$Y_m = \tfrac{1}{2}Z \times \{(2-a) \times i_{m-n+l} - a \times i_{m-n}\}$$

$$Y_{m-r} = \tfrac{1}{2}Z \times \{(2-a) \times i_{m-r-n+l} - a \times i_{m-r-n}\}$$

where Z represents an absolute value of a constant impedance Z in complex notation, $$|\dot{V} - \ddot{Z}\dot{I}| = |X| = |X_m| + |X_{m-r}| + \tfrac{1}{2}||X_m| - |X_{m-r}||$$

$$|\ddot{Z}\dot{I}| = |Y| = |Y_m| + |Y_{m-r}| + \tfrac{1}{2}||Y_m| - |Y_{m-r}||$$

and, judging whether the following expression is satisfied or not:

$$|\dot{V} - \ddot{Z}\dot{I}| - |\ddot{Z}\dot{I}| - K_o > 0$$

where $K_o$ represents a constant.

8. A machine implement method according to claim 1, wherein said producing step comprises judging whether the following expression is satisfied or not:

$$Z\{i_m^2 + \tfrac{1}{4}(i_{m-n+l} - i_{m-n})^2\}$$
$$+ \tfrac{1}{2}\{(v_{m-n+l} - v_{m-n}) \times i_m$$
$$- v_m \times (i_{m-n+l} - i_{m-n})\} - K_o \geq 0$$

where $i_m$, $i_{m-n}$ and $i_{m-n+l}$ represent data of an AC current flowing through a transmission line in the electric power system, $v_m$, $v_{m-n}$ and $v_{m-n+l}$ represent data of an AC voltage on the transmission line, the data $i_m$ and $v_m$ being indicative of instantaneous values at a first time point, the data $i_{m-n}$, $i_{m-n+l}$, $v_{m-n}$ and $v_{m-n+l}$ being indicative of instantaneous values at time points spaced from said first time point by an angle of 90°, Z represents an absolute value of a constant impedance, and $K_o$ represents a constant.

9. A digital protective relay system for protecting an electric power system, comprising:

means for sampling, at a predetermined sampling interval, an AC electrical quantity in the electric power system to obtain data each indicative of an instantaneous value of the electric quantity at the respective sampling time point, an analog-to-digital converter for converting the sampled data into digital data, means for storing the digital data, and processing means for retrieving said stored digital data and preparing a digital data $q_m$ indicative of an instantaneous value at a first time point of an AC electrical quantity concerning the electric power system, and digital data $q_{m-n}$ and $q_{m-n+l}$ indicative of instantaneous values of an AC electrical quantity concerning the electric power system, the data $q_{m-n}$ being indicative of an instantaneous value at a time point in advance of said first time point by an angle of $\alpha°$ in the range of from 0° to 180°, and the data $q_{m-n+l}$ being indicative of an instantaneous value at a time point lagging behind said first time point by an angle of $(180-\alpha)°$, calculating a first value in accordance with the following expression:

$$\tfrac{1}{2}\{a \times q_{m-n} - (2-a) \times q_{m-n+l}\}$$

where $a = \alpha/90$ and, producing the data $q_m$ and said first value a signal for use as a condition for tripping a circuit breaker in said electric power system or for operating an alarm device.

10. A system according to claim 9, wherein $\alpha$ equals 90°.

11. A system according to claim 10, wherein said processing means in said producing step performs the following calculation to find the amplitude Q of an electrical quantity:

$$Q^2 = q_m^2 + \tfrac{1}{4}(q_{m-n} - q_{m-n+l})^2.$$

12. A system according to claim 10, wherein said processing means in said producing step performs the following operation to find the amplitude Q of an electrical quantity:

$$Q = |q_m| + \tfrac{1}{2}|q_{m-n+l} - q_{m-n}| + \tfrac{1}{2}||q_m| - \tfrac{1}{2}|q_{m-n+l} - q_{m-n}||.$$

13. A system according to claim 9, wherein said processing means prepares from sampled and stored data:
   a digital data $v_m$ indicative of an instantaneous value at a first time point of an AC voltage on a transmission line in the electric power system,
   a digital data $v_{m-r}$ indicative of an instantaneous value of the AC voltage at a second time point in advance of said first time point by an angle of 90°,
   digital data $i_{m-n+l}$ and $i_{m-n}$ indicative of instantaneous values of an AC current flowing through the transmission line at time points which are spaced from each other by an angle of 180° and between which said first time point is positioned, and
   digital data $i_{m-r-n+l}$ and $i_{m-r-n}$ indicative of instantaneous values of the AC current at time points which are spaced from each other by an angle of 180° and between which said second time point is positioned.

14. A system according to claim 13, wherein the data $q_{m-n}$ and $q_{m-n+l}$ are indicative of instantaneous values at time points spaced from said first time point by an angle of 90°, and wherein said processing means calculates:

$$X_m = v_m - \tfrac{1}{2}|\dot{Z}|(i_{m-n+l} - i_{m-n})$$

$$X_{m-r} = v_{m-r} - \tfrac{1}{2}|\dot{Z}|(i_{m-r-n+l} - i_{m-r-n})$$

where $\dot{Z}$ represents a constant impedance in complex notation;

$$|\dot{V} - \dot{Z}\dot{I}| = |X| = |X_m| + |X_{m-r}| + \tfrac{1}{2}||X_m| - |X_{m-r}||$$

$$|\dot{V}| = |v_m| + |v_{m-r}| + \tfrac{1}{2}||v_m| - |v_{m-r}||$$

and, judges whether the following expression is satisfied or not:

$$|\dot{V} - \dot{Z}\dot{I}| - |\dot{V}| - K_o > 0$$

where $K_o$ represents a constant.

15. A system according to claim 13, wherein said processing means calculates:

$$X_m = v_m - \tfrac{1}{2}Z \times \{(2-a) \times i_{m-n+l} - a \times i_{m-n}\}$$

$$X_{m-r} = v_{m-r} - \tfrac{1}{2}Z \times \{(2-a) \times i_{m-r-n+l} - a \times i_{m-r-n}\}$$

$$Y_m = \tfrac{1}{2}Z \times \{(2-a) \times i_{m-n+l} - a \times i_{m-n}\}$$

$$Y_{m-r} = \tfrac{1}{2}Z \times \{(2-a) \times i_{m-r-n+l} - a \times i_{m-r-n}\}$$

where Z represents an absolute value of a constant impedance $\dot{Z}$ in complex notation, $$|\dot{V} - \dot{Z}\dot{I}| = |X| = |X_m| + |X_{m-r}| + \tfrac{1}{2}||X_m| - |X_{m-r}||$$

$$|\dot{Z}\dot{I}| = |Y| = |Y_m| + |Y_{m-r}| + \tfrac{1}{2}||Y_m| - |Y_{m-r}||$$

and, judges whether the following expression is satisfied or not:

$$|\dot{V} - \dot{Z}\dot{I}| - |\dot{Z}\dot{I}| - K_o > 0$$

where $K_o$ represents a constant.

16. A system according to claim 9, wherein said processing means judges whether the following expression is satisfied or not:

$$Z\{i_m^2 + \tfrac{1}{4}(i_{m-n+l} - i_{m-n})^2\} + \tfrac{1}{2}\{(v_{m-n+l} - v_{m-n}) \times i_m - v_m \times (i_{m-n+l} - i_{m-n})\} - K_o \geq 0$$

where
   $i_m$, $i_{m-n}$ and $i_{m-n+l}$ represent data of an AC current flowing through a transmission line in the electric power system,
   $v_m$, $v_{m-n}$ and $v_{m-n+l}$ represent data of an AC voltage on the transmission line,
   the data $i_m$ and $v_m$ being indicative of instantaneous values at a first time point,
   the data $i_{m-n}$, $i_{m-n+l}$, $v_{m-n}$ and $v_{m-n+l}$ being indicative of instantaneous values at time points spaced from said first time point by an angle of 90°,
   Z represents an absolute value of a constant impedance, and
   $K_o$ represents a constant.

* * * * *